US010146804B2

(12) United States Patent
Celaya et al.

(10) Patent No.: US 10,146,804 B2
(45) Date of Patent: Dec. 4, 2018

(54) COMPUTER IMPLEMENTED SYSTEMS AND METHODS TO AUGMENT DATA FROM DATA SOURCES BY SIMULTANEOUSLY ADDING ENHANCEMENTS GENERATED BY DIFFERENT TECHNOLOGIES

(71) Applicants: Juan Jose Celaya, Woodlands, TX (US); Leonardo Andres Carbone, Miami, FL (US); Richard Lee King, The Woodlands, TX (US); Daniel Eduardo Capeluto, North Bay Village, FL (US)

(72) Inventors: Juan Jose Celaya, Woodlands, TX (US); Leonardo Andres Carbone, Miami, FL (US); Richard Lee King, The Woodlands, TX (US); Daniel Eduardo Capeluto, North Bay Village, FL (US)

(*) Notice: Subject to any disclaimer, the term of this patent is extended or adjusted under 35 U.S.C. 154(b) by 406 days.

(21) Appl. No.: 13/944,154

(22) Filed: Jul. 17, 2013

(65) Prior Publication Data

US 2014/0025632 A1 Jan. 23, 2014

Related U.S. Application Data

(60) Provisional application No. 61/673,345, filed on Jul. 19, 2012.

(51) Int. Cl.
*G06F 17/30* (2006.01)

(52) U.S. Cl.
CPC .. *G06F 17/30289* (2013.01); *G06F 17/30557* (2013.01)

(58) Field of Classification Search
CPC .............. G06F 17/30289; G06F 17/30557
USPC ......................................... 707/609
See application file for complete search history.

(56) References Cited

U.S. PATENT DOCUMENTS

| 2005/0203887 | A1* | 9/2005 | Joshi | G06Q 10/00 |
| 2010/0174648 | A1* | 7/2010 | Krantz | G06Q 10/06 |
| | | | | 705/44 |
| 2012/0089562 | A1* | 4/2012 | Deremigio | G06F 17/30563 |
| | | | | 707/602 |

* cited by examiner

*Primary Examiner* — Joshua Bullock
(74) *Attorney, Agent, or Firm* — James M. Smedley LLC; James Michael Smedley, Esq.

(57) ABSTRACT

Embodiments of the present invention generally relate to the field of computer implemented methods, software development, and software integration. Specifically, this invention comprises computer implemented applications and methods providing the management and control needed to augment data from different data sources by adding enhancements generated by any number of technologies supported by the invention.

15 Claims, 24 Drawing Sheets

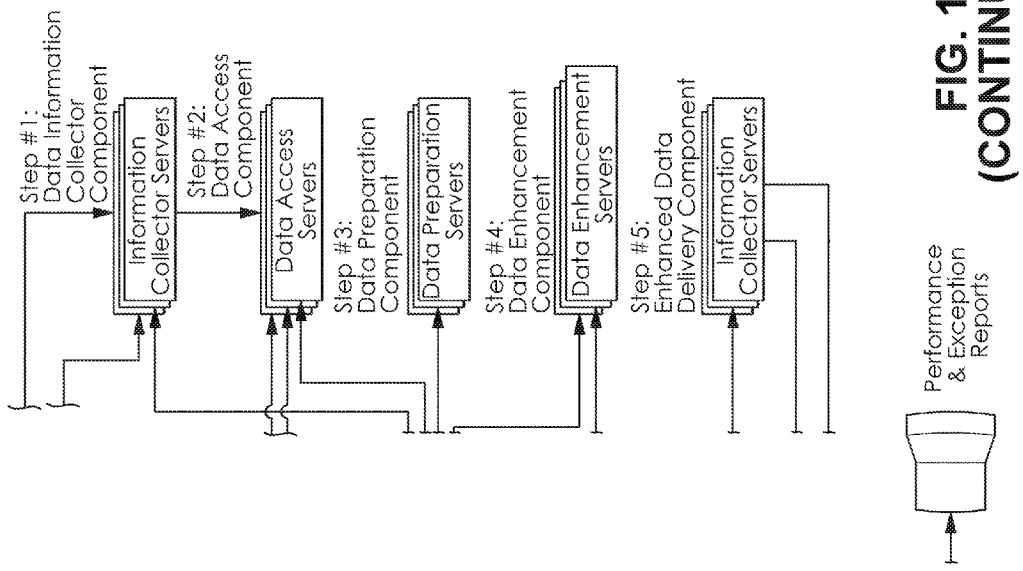

Data Enhancement System Database Specifications

Control Tables

I. DES_System Config – this table contains values that determine overall system values.

| Field | Data Format | Key | Content |
|---|---|---|---|
| CTL_IDX | Integer | Yes | Primary Key |
| SleepTime | Integer | | Amount of this the collector will sleep before checking for new documents |
| NumberThreads | Integer | | Maximum number of threads of any process, zero is no limit. (Default 5) |
| SchedularSetting | Integer | | 0 – Single Server – Single Thread<br>1 – Single Server – Multi-Treaded<br>2 – Multi-Server - Single Threaded<br>3 – Multi Server - Multi Threaded<br>Default = 0 |
| DocumentQueue | Varchar(255) | | Path to the document queue |
| DESWorkArea | Varchar(255) | | Path to a file work area |
| CreatedDate | DateTime | | |

II. DES_SupportedDataSources – one row for each supported data source.

| Field | Data Format | Key | Content |
|---|---|---|---|
| SDS_IDX | Integer | Yes | Primary Key |
| Description | Varchar(50) | | |
| Code | Varchar(2) | | Code for DS |
| CreatedDate | DateTime | | |
| UpdateDate | DateTime | | |

FIG. 13A

Data Enhancement System Database Specifications

III. DES_WorkFlowStep – one row for each possible work flow steps

| Field | Type | Index | Comment |
|---|---|---|---|
| WF_IDX | Integer | Yes | Primary Key |
| Description | Varchar(50) | | |
| MaxThreads | Integer | | 0 Default value - use system default. |
| CreatedDate | DateTime | | |
| UpdateDate | DateTime | | |

IV. DES_Assemblies – Assemblies that perform the various steps of the WF

| Field | Type | Index | Comment |
|---|---|---|---|
| ASM_IDX | Integer | Yes | Primary Key |
| WF_IDX | Integer | Foreign Key | |
| SDS_IDX | Integer | Foreign Key | Optional will only contain a value if this assembly is only for a specific DS |
| Description | Varchar(50) | | |
| ModuleName | Varchar(50) | | Runtime name |
| Class | Varchar(100) | | Name of class that is called. |
| CreatedDate | DateTime | | |
| UpdateDate | DateTime | | |

V. DES_TechnologyEnhancer – one row for each supported data enhancer

| Field | Type | Index | Comment |
|---|---|---|---|
| TXE_IDX | Integer | Yes | Primary Key |
| Description | Varchar(50) | | |
| ConnectionInformation | Varchar(255) | | Information to connect to web services |
| UserName | Varchar(50) | | Base64 Username if necessary |
| Password | Varchar(50) | | Base64 Password if necessary |
| Domain | Varchar(50) | | Domain if needed |
| CreatedDate | DateTime | | |
| UpdateDate | DateTime | | |

FIG. 13B

Data Enhancement System Database Specifications

VI. DES_DataEnhancerTaxonomies – Taxonomies used for data enhancement for a specific technology/Datasource.

| Field | Type/Length | PK | Comment |
|---|---|---|---|
| TAX_IDX | Integer | Yes | Primary Key |
| Taxonomy_ID | Integer | | Key to Remote Taxonomy |
| TaxonomyName | Varchar(255) | | |
| Alt_TaxName | Varchar(255) | | |
| MMD | Varchar(50) | | ManagedMetaData field name |
| CreatedDate | DateTime | | |
| UpdateDate | DateTime | | |

VII. DES_Topology –

| Field | Type/Length | PK | Comment |
|---|---|---|---|
| TOP_IDX | Integer | Yes | Primary Key |
| WF_IDX | Integer | | Foreign Key |
| ServerName | Varchar(255) | | |
| Port | Integer | | |
| CreatedDate | DateTime | | |
| UpdateDate | DateTime | | |

FIG. 13C

Data Enhancement System Database Specifications

Configuration Tables

I. DES_DataSourceConfiguration – will contain all the information that will allow the processing to connect to data source

| Field | Type/Length | Index | Comment |
|---|---|---|---|
| DSC_IDX | Integer | Yes | Primary Key |
| SDS_IDX | Integer | Foreign Key | |
| WF_IDX | Integer | Foreign Key | |
| WF_Sequence | Integer | | Sequence of WorkFlow |
| ConnectionString | Varchar(255) | | Web Services root for this datasource |
| UserName | Varchar(50) | | Base64 User Name |
| Password | Varchar(50) | | Base64 Password |
| Domain | Varchar(50) | | Domain if necessary |
| CreatedDate | DateTime | | |
| UpdateDate | DateTime | | |

II. DES_LocationsEnhanced – List of locations that will be process

| Field | Type/Length | Index | Comment |
|---|---|---|---|
| DSLE_IDX | Integer | Yes | Primary Key |
| DSC_IDX | Integer | Foreign Key | |
| DS_Location | Varchar(255) | | In SharePoint Library Name |
| CreatedDate | DateTime | | |
| UpdateDate | DateTime | | |

III. DES_TaxonomiesToApply – List of Taxonomies to be applied to each location.

| Field | Type/Length | Index | Comment |
|---|---|---|---|
| DTX_IDX | Integer | Yes | Primary Key |
| DSC_IDX | Integer | Foreign Key | |
| Taxonomy_Name | Varchar(255) | | |
| Taxonomy_iD | Integer | | |
| CreatedDate | DateTime | | |
| UpdateDate | DateTime | | |

FIG. 13D

Data Enhancement System Database Specifications

Processing Tables i. DES_ProcessingQueue – This table contains a list of all document that are in the DES Processing Pipeline. These records will be removed once the process has completed.

| Field | Type | Index | Comment |
|---|---|---|---|
| DES_GUID | Varchar(50) | Primary Key | This Guid will come from the XML file created by the originating program |
| DSC_Index | Integer | Foreign Key | |
| ServerName | Varchar(100) | Index_1 | Server that should process this request. |
| DocumentName | Varchar(255) | | |
| DocumentType | Char(4) | | Type of Document or container |
| ProcessingStep | Integer | Index_1 | This is the step in the workflow that this particular job is in. It is the responsibility of the WorkFlow Manager to move to next step once current step is complete. Step Zero is the status of a newly created Job. |
| ProcessingStatus | Integer | Index_1 | Number indicating the current status in the Step:<br>1. Ready to begin<br>2. In Process<br>3. Error<br>4. Completed |
| CreatedDate | DateTime | | |

FIG. 13E

Data Enhancement System Database Specifications

II. DES_Documents – this table contains both the binary and text of the documents to be processed

| Field | Type/Length | Keys | Contents |
|---|---|---|---|
| DES_QUID | Varchar(20) | Primary Key | This Guid will come from the XML file created by the originating program |
| Sequence | Integer | Primary Key | The sequence of the document if part of a container will be Zero for single document or the container itself |
| DocumentBinary | Varbinary(max) | | Document Native form |
| BinarySize | Integer | | |
| DocumentText | Varchar(max) | | Document Text |
| TextSize | Integer | | |

III. DES_EnhancementInformation – Only need one record per taxonomy. If Documents are part of a container, then the container gets the classification.

| Field | Type/Length | Keys | Contents |
|---|---|---|---|
| DES_QUID | Varchar(20) | Primary Key | This Guid will come from the XML file created by the originating program |
| TaxonomyID | Integer | | |
| EMMTaxName | Varchar(50) | | Name of EMM Taxonomy |
| MMDFieldName | Varchar(50) | | Name of MMD Field |
| EnhancementValues | Varchar(max) | | Classification Values |

FIG. 13F

Data Enhancement System Database Specifications

Logging and Reporting Tables i. DES_ProcessingLog - Report Logging

| Field | Type/Length | Index | Comments |
|---|---|---|---|
| DES_QUID | Varchar(20) | Primary Key | This Guid will come from the XML file created by the originating program |
| DSC_Index | Integer | | |
| DocumentSource | Varchar(255) | Foreign Key | Where Document was located, i.e. Library |
| DocumentName | Varchar(255) | | |
| CreatedDate | DateTime | | | ii. DES_ProcessingLogDetail – The detail from the DES Pipeline

| Field | Type/Length | Index | Comments |
|---|---|---|---|
| DES_QUID | Varchar(20) | Primary Key | This Guid will come from the XML file created by the originating program |
| WF_IDX | Integer | Foreign Key | Work Flow step |
| Action | Integer | | 0 – Start<br>1 – End<br>2 – Error |
| Error_Msg | Varchar(255) | | |
| Date | DateTime | | |

FIG. 13G

COMPUTER IMPLEMENTED SYSTEMS AND METHODS TO AUGMENT DATA FROM DATA SOURCES BY SIMULTANEOUSLY ADDING ENHANCEMENTS GENERATED BY DIFFERENT TECHNOLOGIES

CROSS-REFERENCE TO RELATED APPLICATIONS

This application claims the benefit of the following provisional application, each of which is hereby incorporated by reference in its entirety: U.S. Pat. App. No. 61/673,345 filed on Jul. 19, 2012 and entitled "Computer implemented applications and methods to augment data from Data Sources by simultaneously adding enhancements generated by different Technologies".

FIELD OF INVENTION

Embodiments of the present invention generally relate to the field of computer implemented methods, software development, and software integration. Specifically, this invention comprises computer implemented applications and methods providing the management and control needed to augment data from different data sources by adding enhancements generated by any number of technologies supported by the invention.

BACKGROUND

Data enhancement is a growing need in today's environments. As the volume of data grows it is harder to identify and classify it because the process is subjective and mainly done by humans. The same data can be classified into many different groups based on its content and many times it is either classified incorrectly or requirements changed and it must be reclassified. To address this time consuming manual task and the growing volumes of data, Technologies have been built that will analyze the data, generate enhancements which are made part of the data and then used in an automated classification process. Additionally these enhancements are also used as part of the data for search engines to improve the accuracy of the search engine's results. However, integrating one Technology into one or more Data Sources is a very hard task and almost impossible due to the incompatibility and restrictions between Technologies and Data Sources. It is even harder and very expensive to integrate multiple Technologies with multiple Data Sources.

Information Management, Document Management, and Enterprise Content Management Systems as well as other computer software application ("Software Application" or "Software Applications") environments enforce numerous access restrictions within their software. This is particularly true in the new Cloud Computing Environments ("The Cloud") where these restrictions are more prevalent.

Data Source restrictions limit the access and update capabilities that Technologies, wishing to work within the Data Source, have to the data stored in these Data Sources. This situation causes these Technologies to be limited in their use to data stored in Data Sources not enforcing the restrictions. In these cases the organization will not be able to use these Technologies due to the restrictions placed by the Data Source. Therefore this requirement negatively affects both vendors of the Technologies and customers with data in Data Sources.

While organizations attempt to address Data Source restrictions, flexibility for change and simultaneous integration to multiple Technologies and Data Sources is not taken into account by the organizations. These systems continue to be dependent and focus on the needs that are in place within organization and are specific to those organizations. Since modifications made by organizations to these Technologies are specific to their Data Source and the modifications are made on a customer by customer basis, currently existing methods are unable to augment data in way that avoids the pitfalls that arise from these modifications.

In summary, for security and stability reasons, Data Sources make it very hard for Technologies to integrate with them while at the same time there is a growing need in the market to automatically augment data using these Technologies. Therefore there is a need in the market for implementing methods that (a) are simple, scalable, and easy for organizations and individuals to install, configure and integrate into their computing environment, (b) provide unrestricted access to Data Sources regardless of its storage location and (c) provide enhancement and augmentation of the data with any Technology. These and other features and advantages of the present invention will be explained and will become obvious to one skilled in the art through the summary of the invention that follows.

SUMMARY OF THE INVENTION

Accordingly, it is an aspect of the present invention to provide systems and methods for which receive or retrieve data stored in Data Sources and makes it available to Technologies for processing. Once the Technologies have completed their tasks, enhancements are provided to the invention by the Technologies for inclusion as part of the data. This step within the invention's process causes the data to be augmented by the enhancements provided by the Technologies. The invention can interact with one or more Data Sources and Technologies simultaneously allowing for the data to be augmented from enhancements of one or more Technologies during one single pass of the data through the invention's process.

According to an embodiment of the present invention, a system for simultaneously augmenting data in one or more data sources by using enhancements generated by different technologies, the system including a component manager module, comprising computer-executable code stored in non-volatile memory, and a processor, wherein the component manager module and the processor are operably connected and configured to receive notification that a first set of data is incompatible with a first application, wherein a data information component integrates with one or more data sources that contains the first set of data, send information about the first set of data to a data information collector component, wherein the data information collector component prepares to update a system database, update the system database, wherein the data information collector component provides the system database with the information about the first set of data, copy the first set of data from the one or more data sources into the system database, wherein a data access component receives the first set of data from the data source, augment the first set of data, wherein a data preparation component processes the first set of data into prepared data set that will meet one or more requirements of one or more technologies that will use the prepared data set, store the prepared data set, wherein the data preparation component stores the prepared data set in the system database, provide the prepared data set from the system database to the one or more technologies via one or more data enhancement components, wherein each of the one or more data enhancements components is configured to interact with one of the one or more technologies, receive from the one or more technologies enhancements the prepared data set, wherein each of the one or more data enhancement components interacts with one or more of the one or more technologies, wherein the enhancements are modifications to the prepared data set, send the enhancements provided by each of the one or more technologies to the one or more data sources, wherein an enhanced data delivery component delivers the enhancements of the prepared data to the one or more data sources.

According to an embodiment of the present invention, a method for simultaneously augmenting data in one or more data sources by using enhancements generated by different technologies, the method including receiving notification that a first set of data is incompatible with a first application, wherein a data information component integrates with one or more data sources that contains the first set of data, sending information about the first set of data to a data information collector component, wherein the data information collector component prepares to update a system database, updating the system database, wherein the data information collector component provides the system database with the information about the first set of data, copying the first set of data from the one or more data sources into the system database, wherein a data access component receives the first set of data from the data source, augmenting the first set of data, wherein a data preparation component processes the first set of data into prepared data set that will meet one or more requirements of one or more technologies that will use the prepared data set, storing the prepared data set, wherein the data preparation component stores the prepared data set in the system database, providing the prepared data set from the system database to the one or more technologies via one or more data enhancement components, wherein each of the one or more data enhancements components is configured to interact with one of the one or more technologies, receiving from the one or more technologies enhancements the prepared data set, wherein each of the one or more data enhancement components interacts with one or more of the one or more technologies, wherein the enhancements are modifications to the prepared data set, sending the enhancements provided by each of the one or more technologies to the one or more data sources, wherein an enhanced data delivery component delivers the enhancements of the prepared data to the one or more data sources.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

BRIEF DESCRIPTION OF THE DRAWINGS

FIG. 1 presents an exemplary workflow and an embodiment of dependencies of components as each would process data stored in the Data Source.

FIG. 2 presents an exemplary workflow and embodiment of dependencies of components as each would process data stored in the Data Source.

FIG. 3 presents an exemplary workflow and embodiment of components as each would process the data in storage location of a computer.

FIG. 6 presents an example of the workflow and dependencies of the components as each would process the data stored in the Data Source.

FIGS. 13A-G illustrate an exemplary embodiment of the invention's database. In this embodiment, the database design shown in FIG. 13 presents a sample of how the database can be constructed to support the functionality of the invention and the successful processing of data by the invention.

DETAILED SPECIFICATION

Figure 1:
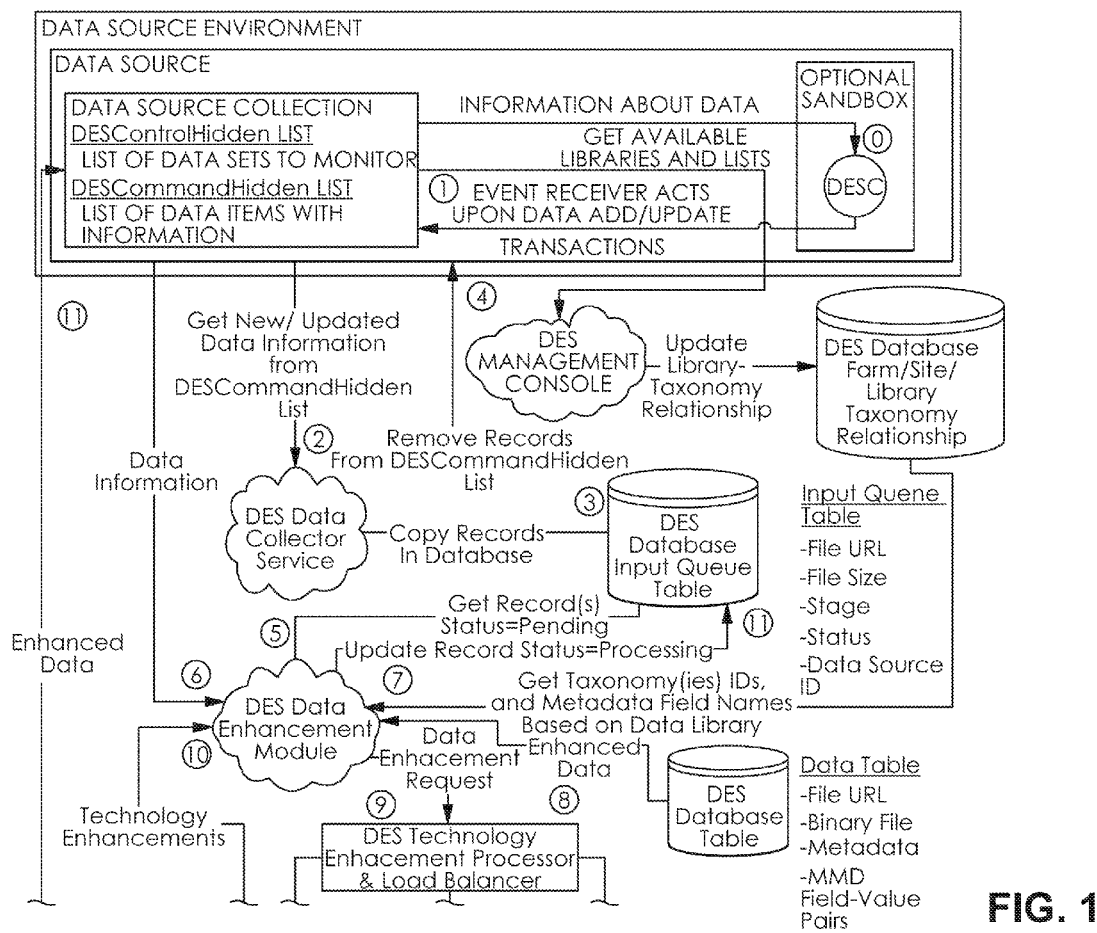
FIG. 1 illustrates an example of how an exemplary embodiment of the present invention connects to a Data Source. In this example, components and connectivity points to the Data Source and Technology are shown. Additionally.
Figure 1:
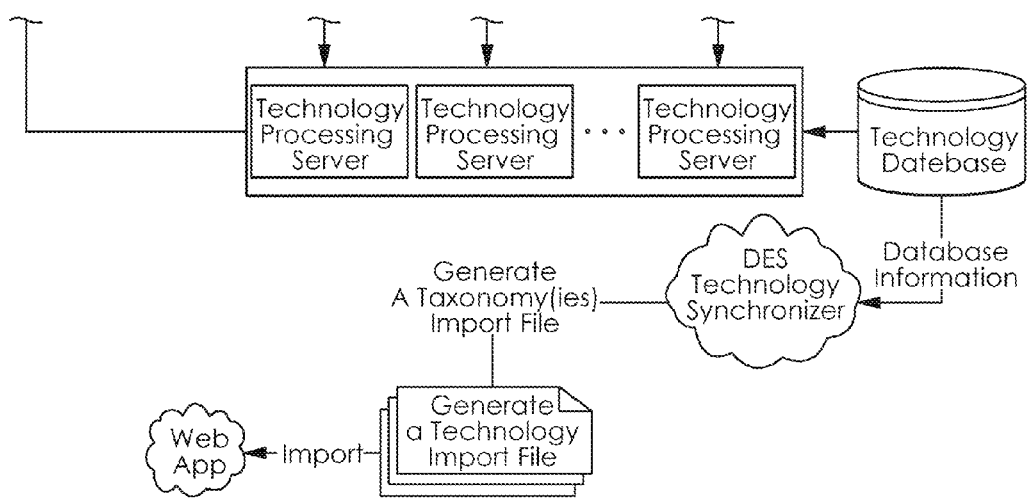
Figure 2:
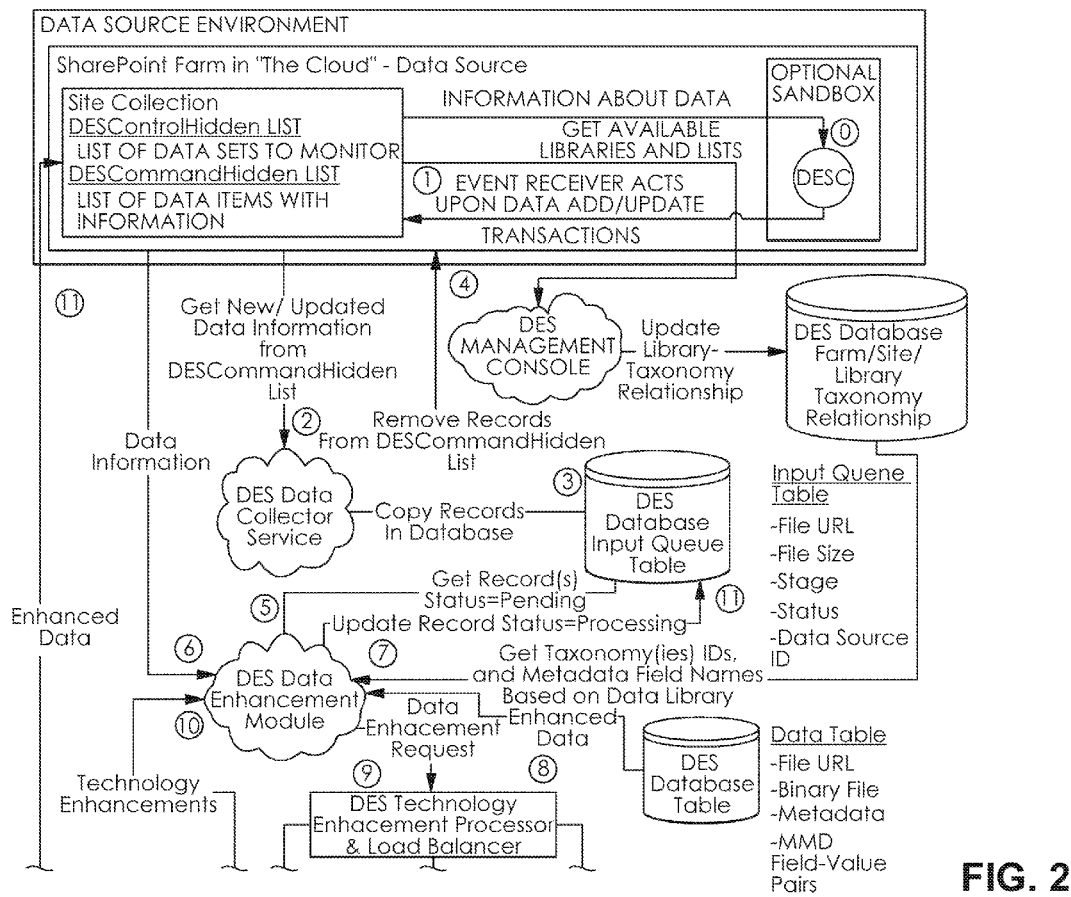
FIG. 2 illustrates an exemplary embodiment of a process flow for connecting to a Data Source. In this example, components and connectivity points are shown as described herein to the Data Source and Technology. Additionally.
Figure 2:
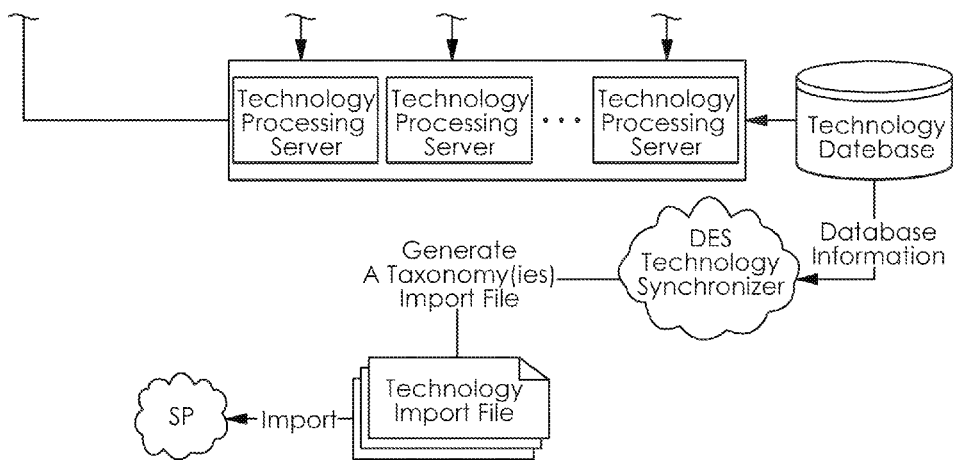
Figure 3:
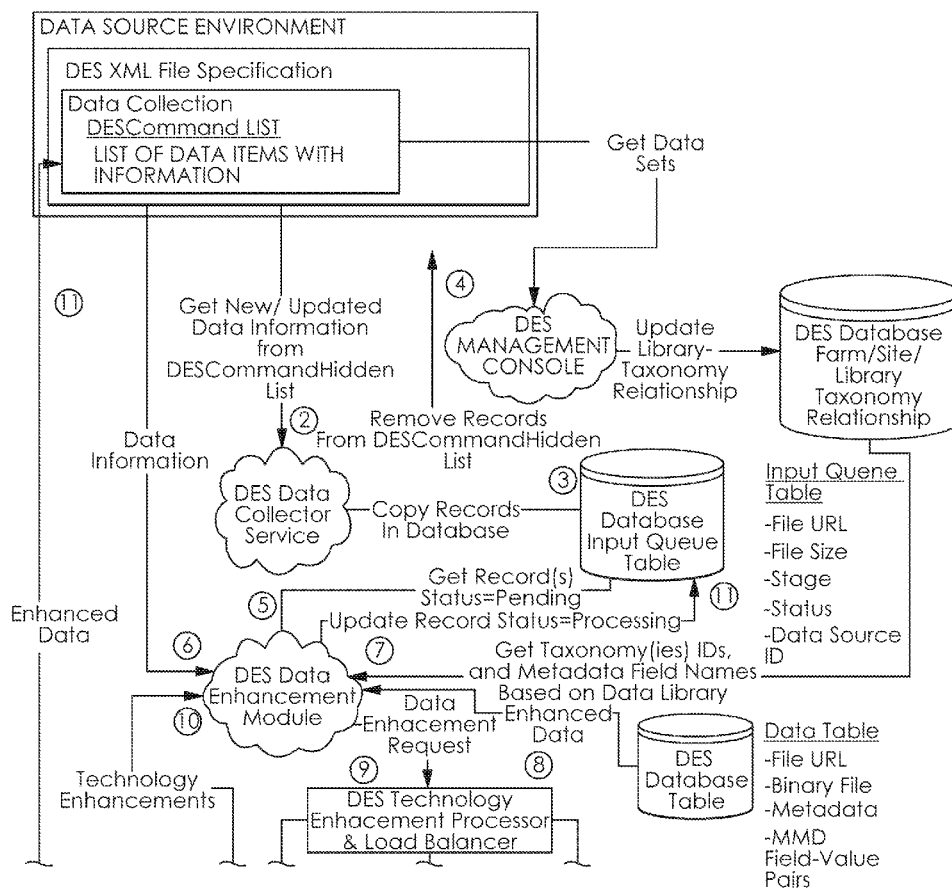
FIG. 3 illustrates an exemplary embodiment of a process flow for connecting to data stored in a storage location of a computer. Components and connectivity points to the storage location and Technology are shown, as described herein. Additionally.
Figure 3:
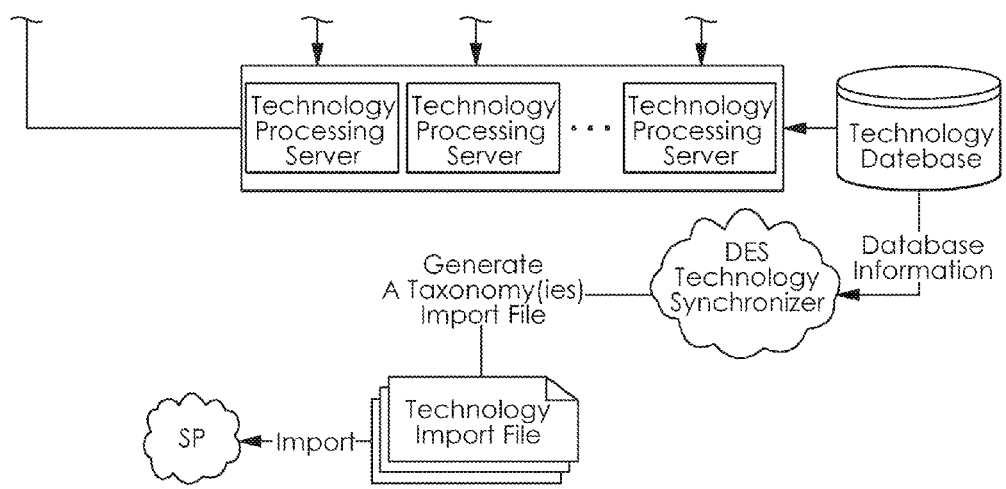

Embodiments of the present invention generally relate to the field of computer implemented systems, methods, software development, and software integration. Specifically, this invention comprises computer implemented systems, applications and methods providing the management and control needed to augment data from different data sources by adding enhancements generated by any number of technologies supported by the invention.

According to an embodiment of the present invention, the system works by simultaneously interacting with many data sources, preparing the data, and then processing the data using the assigned technologies. The resulting enhancements generated by the technologies is then combined with the data and made available within the data source. Working with the technology, the system provides end users the ability to define rules used for the augmentation process. The system also provides all management and reporting controls for the successful execution of the system.

By integrating with Technologies "outside" of these restrictive environments, the system connects to Data Sources while complying with the Data Sources' restrictions. This enables the system to create a bridge between any Technology and any Data Source without the Technologies having to be modified to meet the restrictions being enforced by the Data Source. As an illustrative example, since The Cloud is a fairly new market, many Technologies are developed without keeping in mind the restrictions The Cloud enforces or based on the Technologies design specifications they cannot function in The Cloud. As a result many existing products can't be used in The Cloud without major modifications or simply can't be made to work in The Cloud environment.

Embodiments of the system described herein provide methods that standardize the architecture and communication interfaces enabling the system to simultaneously connect to multiple Data Sources on one end and to multiple Technologies on the other end. This allows its use by any organization with minimal integration effort.

Exemplary embodiments of the methods utilized by the system use basic and nonrestrictive functions of a Data Source architecture to support new versions of the Data Sources without major changes. This is at least in part, due to the system's minimal interaction with the Data Source. Additionally, the system is architected to integrate with any Technology and is not designed to work specifically with one particular Technology. Finally, embodiments of the system are also designed to simultaneously work with multiple Data Sources and Technologies.

As used herein the term "computer" or "computing device" shall mean any device capable of processing software code. Examples of a computer may include, but are not limited to, a desktop computer, a laptop computer, a server, a tablet, a phone, or any other mobile computing device. In certain embodiments, the term computer/computing device may be used to refer to a plurality of computing devices or computers communicatively connected and operating in a distributed computing environment (e.g., server cluster, workgroup). One of ordinary skill in the art would appreciate there are numerous examples of devices that could be used as computers, and embodiments of the present invention are contemplated for use with any such device.

As used herein the term "storage location" shall mean any device capable of storing data. Examples of a storage location may include, but are not limited to a hard drive, a portable hard drive, a server, or any other device capable of storing data. Storage locations may also include a plurality of devices communicatively connected and operating in a local (e.g., RAID configuration) or distributed storage environment (e.g., cloud based storage). One of ordinary skill in the art would appreciate there are numerous examples of devices that could be used as storage locations, and embodiments of the present invention are contemplated for use with any such device.

As used herein the terms "Data Source" and "Data Sources" shall mean a Software Application, Software Applications, data located on The Cloud or data in storage locations as appropriate and where restrictions may or may not be enforced.

As used herein the terms "Technology" and "Technologies" shall mean software applications including, but not limited to, $3^{rd}$ party software applications or computer hardware which access or receive data from Data Sources and processes data from those Data Sources.

As used herein the term "data" shall mean the content in Data Sources that will be processed by Technologies.

As used herein the term "enhancement" and "enhancements" shall mean what Technologies generate after processing the data which is then used to enhance the data.

As used herein the term "enhanced data" and "augmented data" shall mean the resulting data after the enhancements generated by Technologies has been applied to the data.

As used herein the term "resources" shall mean any physical or virtual component of limited availability within a computer system. Virtual system resources include files, network connections, memory areas and other computer systems accessible via network connections.

As used herein the term "restriction" shall mean a security mechanism for separating running programs which typically provide a tightly-controlled set of resources for software programs to run in.

As used herein the term "return address" shall mean the location where the enhancements or enhanced data must be stored.

As used herein the term "action" shall mean an event that happens to data that will cause the data to be selected for Technologies to process.

As used herein the term "component" shall generally mean one or more methods performed by a computer software program which is a written program or procedure or set of rules associated with the performance of tasks by a computer.

In some embodiments, the system contains one or more components that integrate into the Data Sources and prepares information used for the retrieval of the data by another component of the system or directly provides information to another component of the system.

In some embodiments, the system receives or retrieves the information created by the system's components in the Data Sources and creates information record(s) in the system's databases in preparation for processing the data identified by the system's components in the Data Sources. The system then flags the information record created in the system's databases for processing by the next step in the system's workflow. In other embodiments, this step may be skipped and the system may simply proceed to sending a message together with details of the data to be processed and continuing from the next step of the process.

In some embodiments, the information record stored in the system's databases is then processed and the data plus any related metadata is received or retrieved from the Data Source and stored in the system's databases. Once all the information needed for the successful processing of the data is in the system's databases, the information record is flagged for processing by the next step in the system's workflow.

In some embodiments, the data and metadata associated with each information record in the system's databases are prepared for processing by the Technologies. The data and metadata preparation tasks vary depending on what is being processed and the Technologies used. Once everything is successfully prepared and stored in the system's databases, the information record is flagged for processing by the next step in the system's workflow.

In some embodiments, the necessary data and metadata associated with each information record in the system's databases are now provided, by the system, to the Technologies configured to process the data, the system works with each Technology by providing all that was prepared and waits for a response from each Technology. Once a successful response is identified, the system will update the information record in the system's databases and the information record is flagged for processing by the next step in the system's workflow.

In some embodiments, the system now processes the information record in system's databases, communicates with the Data Source and causes the necessary updates to happen to the data stored in the Data Source.

In some embodiments, if the Return Address of the data is different from the Data Source where the data was acquired using the system's Data Access Component (FIG. 8), the system will cause the necessary updates to happen at the Return Address assigned to the data processed.

In some embodiments, the system maintains information and metrics on all of its transactions, performance and/or errors.

In some embodiments, the system provides management GUI interfaces that enables an administrator and end users to access the methods, components and systems of the system at a local machine or remotely. In some embodiments, the system provides security and access controls for multiple users or administrators. In some embodiments, the system provides reporting capability and real-time performance monitoring and management.

In some embodiments, the system provides a distributed and scalable architecture that enables all of its components to be distributed across multiple machines without restriction of location in the network. In some embodiments, the system takes into account hardware characteristics that enable the system to execute in the particular hardware architecture of the servers it was installed. In some embodiments, the system provides for performance tuning and software architectures such as multithreading.

According to an embodiment of the present invention, the system is made up of multiple components tasked with performing specific methods on a computer in a unique and methodical fashion to complete a process. The methods performed by each component for each of the system's processes causes a computer to receive or retrieve data stored in Data Sources; the data is then made available to Technologies which make enhancements available through methods of the system as described herein. The system augments the data with the enhancements provided by the Technologies by adding these enhancements to the data residing within the Data Source or storing the augmented data in a different but predefined storage location.

According to an embodiment of the present invention, the system provides a set of methods that instruct a computer to perform specifically defined tasks that may be performed within the system's processes to successfully accomplish the function of the system. In one embodiment, the system is made up of six categories of processes with tasks defined by their associated methods. In alternate embodiments, the system may be made up of additional or fewer than six categories of processes. One of ordinary skill in the art would appreciate that the system could be practiced with a variety of process categories, and embodiments of the present system are contemplated for use with any such variety of process categories. Further, it should be note that while several of the descriptions of the system contained herein describe the various components as parts of the system, one of ordinary skill in the art would appreciate that the system may be accomplished through the utilization of fewer components, including by allowing for certain components (e.g., databases) to be controlled, managed and accessed as remote components. In this manner, the system may be comprised of fewer components, such as only the components required to perform one or more of the core methods described herein, with ancillary services (e.g., data storage, processing) being handled by a remote or distributed system.

In a preferred embodiment of the present invention, the components associated with the system for providing the methods described herein may include, but are not limited to: (1) Data Information Component, (2) Data Information Collector Component, (3) Data Access Component, (4) Data Preparation Component, (5) Data Enhancement Component, and (6) Enhanced Data Delivery Component. (Refer to FIG. 12). In alternate embodiments, the invention may use additional or fewer methods to successfully complete the function of the system. One of ordinary skill in the art would appreciate that a number of methods could be used to successfully complete one or more of the functions of the system, and embodiments of the present invention are contemplated for use with any such methods.

In some embodiments, a method exists which is associated with each of the six methods used to successfully complete one or more of the functions of the system and controls the number of components that will simultaneously process data. This method is herein referred to as "Component Manager & Load Balancer". This method's function is to allow for scalability of the system and to increase the performance of the system through the proper management of the components it is associated with.

Figure 4:
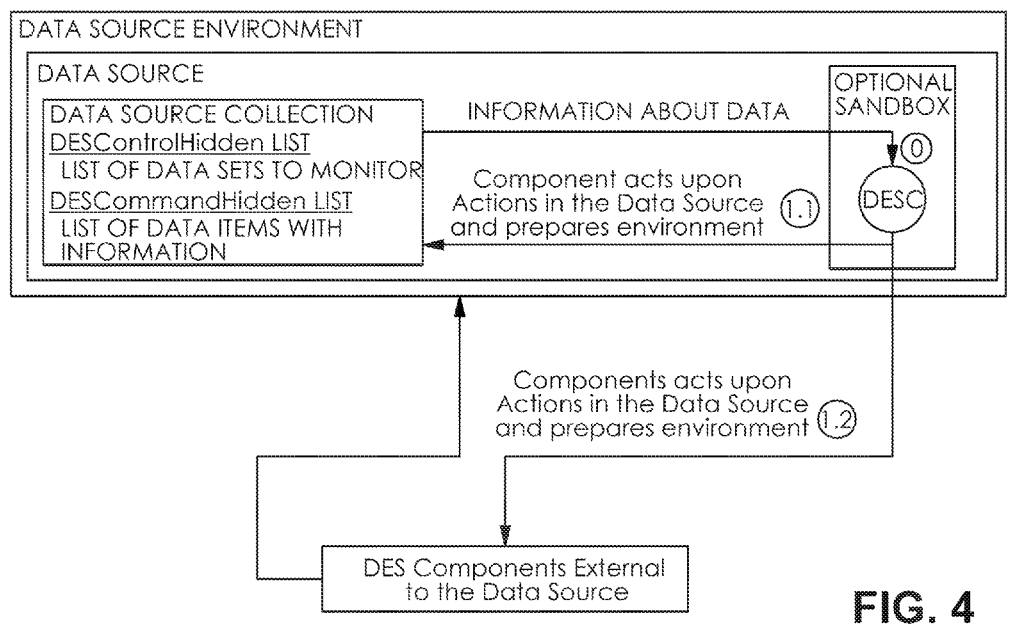
FIG. 4 presents an exemplary embodiment of the invention's Data Source Component and its interaction in some embodiments of its integration with the Data Source. Based on the Data Source restrictions the information gathered by this component of the invention may keep the information within the Data Source for later retrieval or it may deliver the information directly to the invention.
Figure 5:
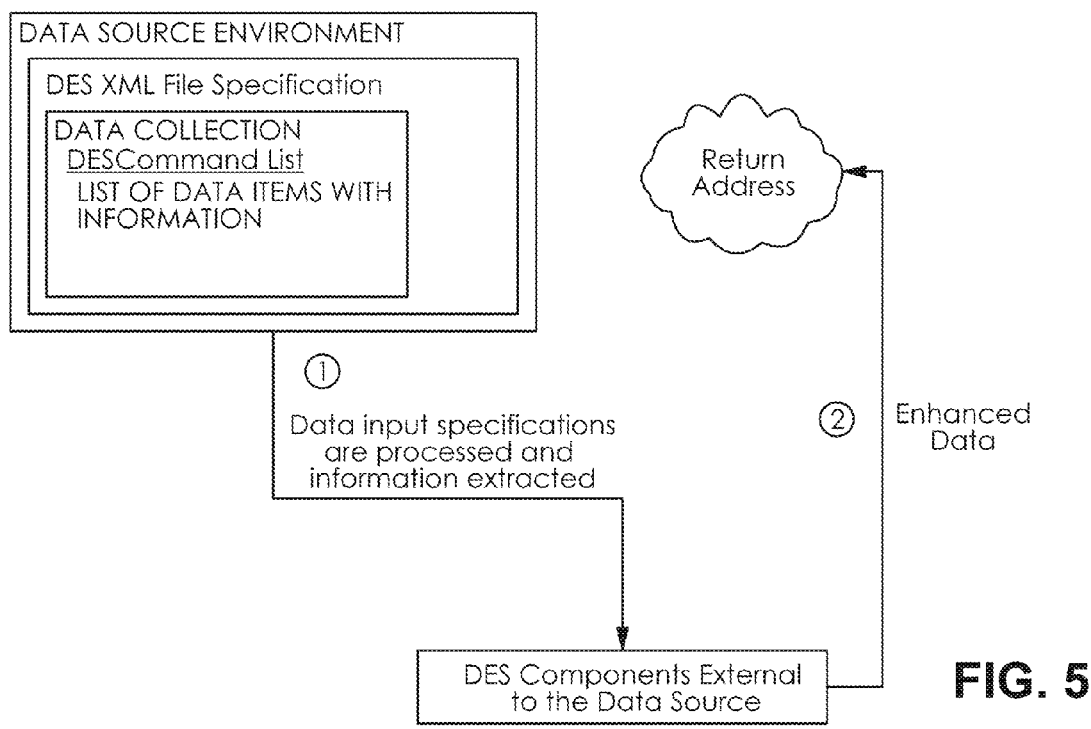
FIG. 5 presents an exemplary embodiment of the invention's data in a storage location and its interaction in some embodiments of its integration with the data specification file. Based on the storage location restrictions the information gathered by this component of the invention may keep the information within the storage location for later retrieval or it may deliver the information directly to the invention.
Figure 6:
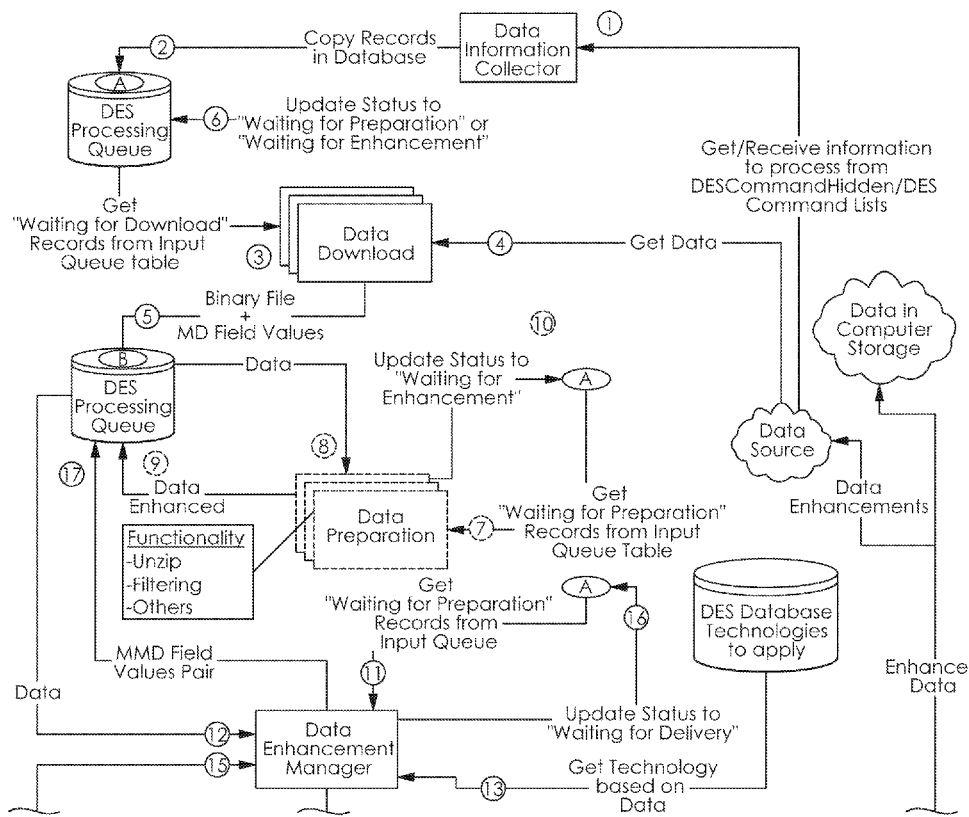
FIG. 6 illustrates an exemplary embodiment of the components that make up the portion of the system described herein that resides external to the Data Source. Additionally.
Figure 6:
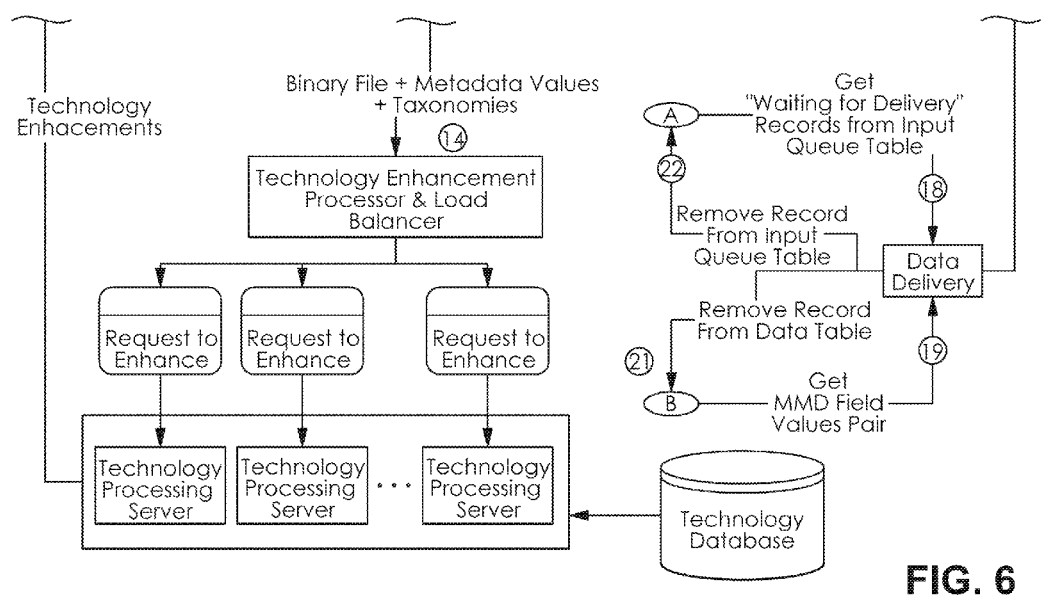

In some embodiments, the Data Information Component's (1) function, among others, is to get, receive or provide information about the data to be processed. This component integrates with or into the Data Source to make information available for the first component in the system's workflow. In some embodiments of this component, the component may be developed as a set of specifications, such as an XML file, for the system to process or as a software program that will interact with the software applications containing the data and, create information about the data for input by the system. The Data Information Component embodiment shown in FIGS. 4 and 5 presents some examples of the objects used by this component.

Figure 7:
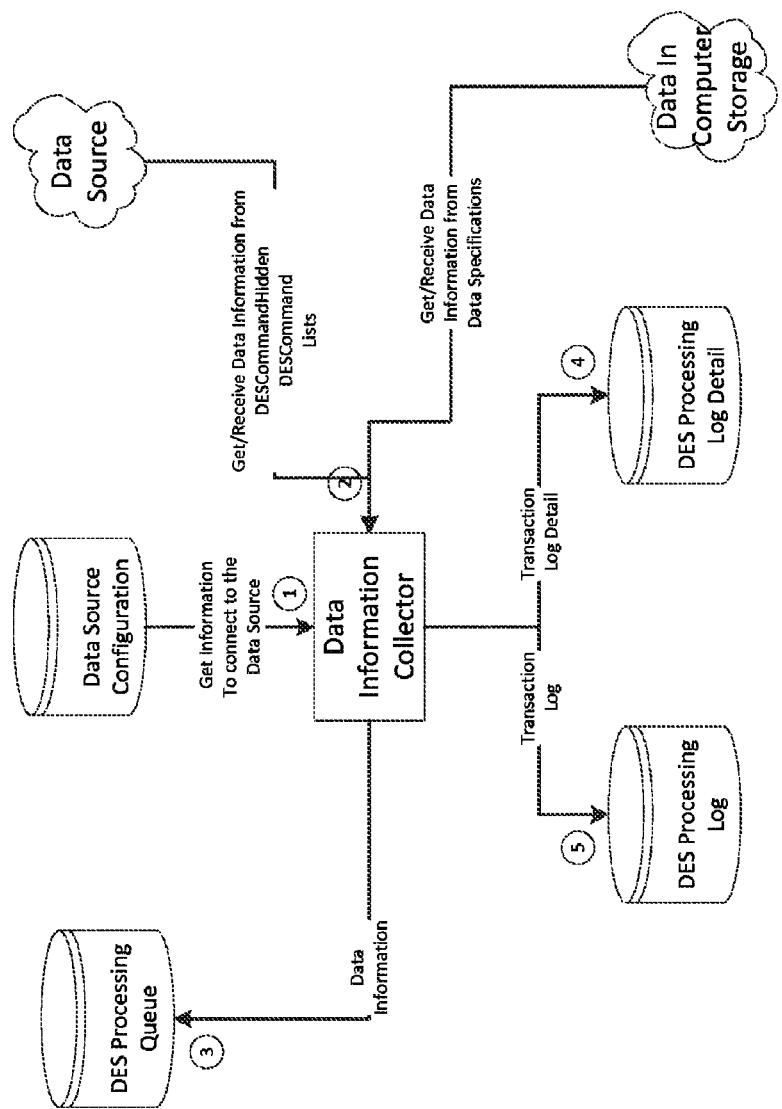
FIG. 7 presents an exemplary embodiment the invention's component that is responsible to get or receive the information about the data to be processed. In this example, the component shown in FIG. 7 shows a sample of the objects used by this component.

In some embodiments, the Data Information Collector Component's (2) function, among others, is to initiate the system's workflow. The Data Information Collector Component receives or retrieves the information from the Data Information Component and updates the system's database with details about the data to be enhanced. The Data Information Collector Component is controlled by a Component Manager & Load Balancer which manages the component and assigns the data it needs to process. The Component Manager & Load Balancer is designed to manage more than one Data Information Collector Component at a time. This architecture allows the Data Information Collector Component to scale in support of millions of data transactions that may need to be processed and by distributing the workload among multiple computers in different network locations, increase the performance of the overall process and reduce the time it takes to deliver the desired results. At the successful completion of this component's tasks the information for the next component in the system's workflow will be available in the system's database. The Data Information Collector Component embodiment shown in FIG. 7 presents an example of the objects used by this component.

Figure 8:
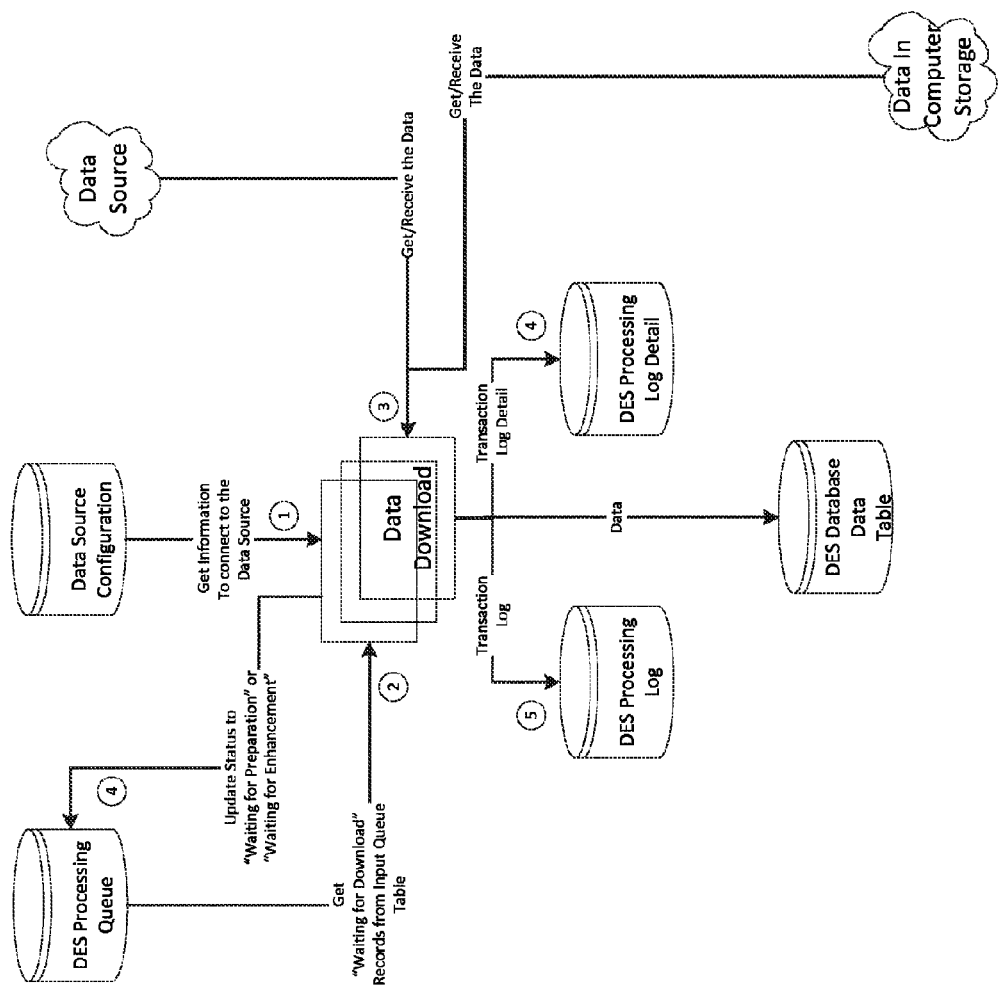
FIG. 8 presents an exemplary embodiment of the invention's component that is responsible to get or receive the data in the Data Source to be processed. In this example, the component shown in FIG. 8 shows a sample of the objects used by this component.

In some embodiments, the Data Access Component's (3) function, among others, is to copy the data and associated metadata from its original Data Source location into the system's database. This task is achieved by receiving the data and associated metadata from the software application where it resides, by retrieving it via a standard communication protocol made available by the software application where the data resides or available from the computer server where the data is located. The Data Access Component is controlled by a Component Manager & Load Balancer which manages the component and assigns the data it needs to process. The Component Manager & Load Balancer is designed to manage more than one Data Access Component at a time. This architecture allows the Data Access Component to scale in support of millions of data transactions that may need to be processed and by distributing the workload among multiple computers in different network locations, increase the performance of the overall process and reduce the time it takes to deliver the desired results. At the successful completion of this component's tasks the information for the next component in the system's workflow will be available in the system's database. The Data Access Component embodiment shown in FIG. 8 presents an example of the objects used by this component.

Figure 9:
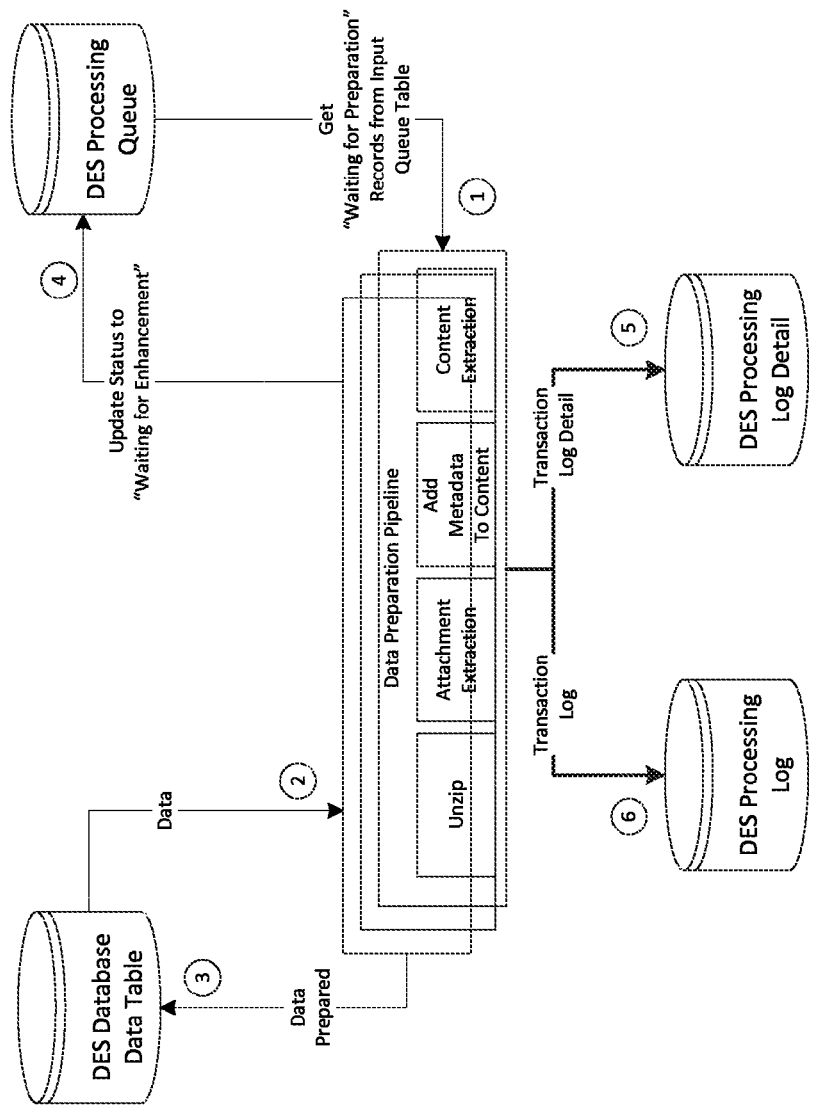
FIG. 9 presents an exemplary embodiment of the invention's component that is responsible to prepare the data gathered from the Data Source based on the specific requirements of the Technology receiving the data. In this example, the component shown in FIG. 9 shows a sample of the objects used by this component.

In some embodiments, the Data Preparation Component's (4) function, among others, is to prepare the data stored in the system's database to meet the specific requirements of the Technology that will receive the data. This task takes into account the format the data is in and any metadata associated with the data. The Data Preparation Component extracts, if any, all attachments from the data, extracts files within archives or compressed files such as files with extensions zip, tar, jar, etc., prepare them for processing by the appropriate Technologies and then stores the prepared data in the system's database. The Data Preparation Component is controlled by a Component Manager & Load Balancer which manages the component and assigns the data it needs to process. The Component Manager & Load Balancer is designed to manage more than one Data Preparation Component at a time. This architecture allows the Data Preparation Component to scale in support of millions of data transactions that may need to be processed and by distributing the workload among multiple computers in different network locations, increase the performance of the overall process and reduce the time it takes to deliver the desired results. At the successful completion of this component's tasks the information for the next component in the system's workflow will be available in the system's database. The Data Preparation Component embodiment shown in FIG. 9 presents a sample of the objects used by this component.

Figure 10:
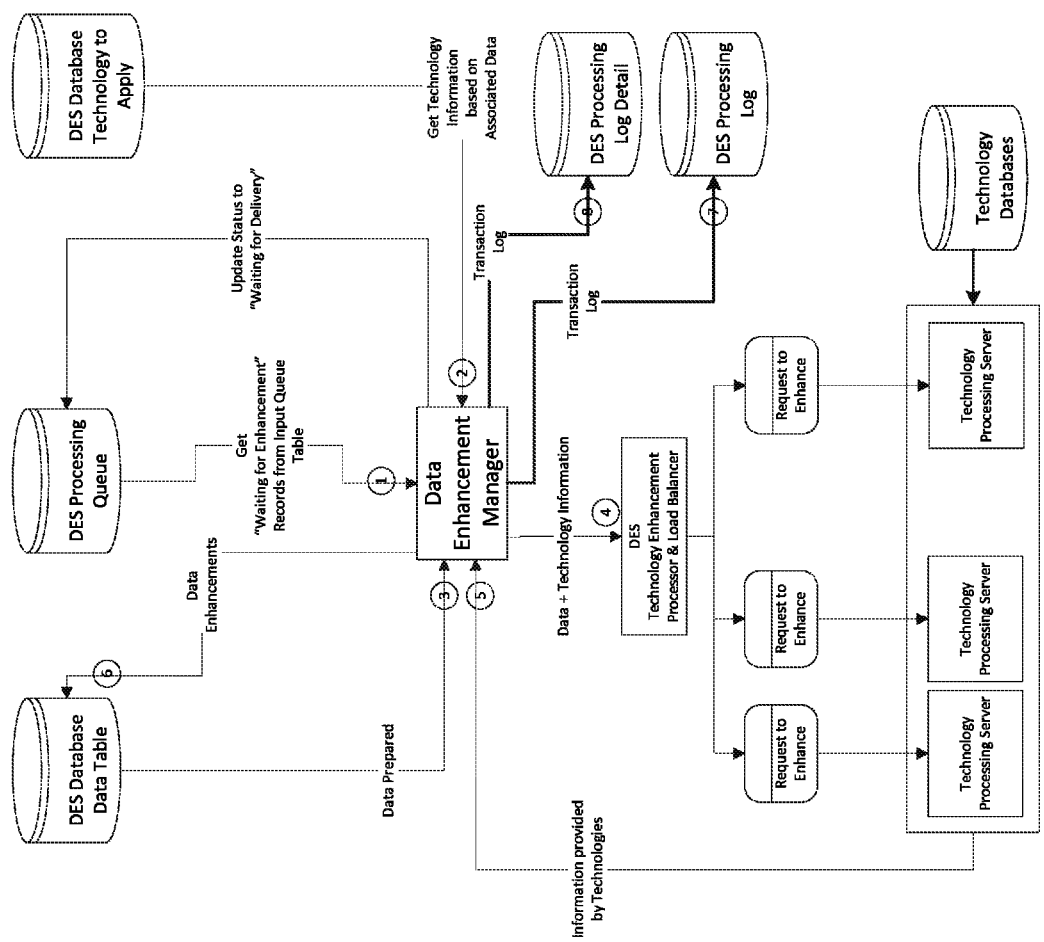
FIG. 10 presents an exemplary embodiment of the invention's component that is responsible to interact with the Technologies assigned to receive the data and gather the enhancements provided by each Technology as each Technology completes their respective task with the data. In this example the component shown in FIG. 10 presents a sample of the objects used by this component.

In some embodiments, the Data Enhancement Component's (5) function, among others, is to interact with the Technologies assigned to receive the data and gather the enhancements provided by each Technology as each Technology completes their respective task with the data. There is a Data Enhancement Component used with each Technology. The Data Enhancement Component is controlled by a Component Manager & Load Balancer which manages the component associated with the Technology and assigns the data it needs to process. The Component Manager & Load Balancer is designed to manage more than one Data Enhancement Component at a time. This architecture allows The Data Enhancement Component to scale in support of millions of data transactions that may need to be processed and by distributing the workload among multiple computers in different network locations, increase the performance of the overall process and reduce the time it takes to deliver the desired results. At the successful completion of this component's tasks the information for the next component in the system's workflow will be available in the system's database. The Data Enhancement Component embodiment shown in FIG. 10 presents an example of the objects used by this component and the order of the tasks this component executes.

Figure 11:
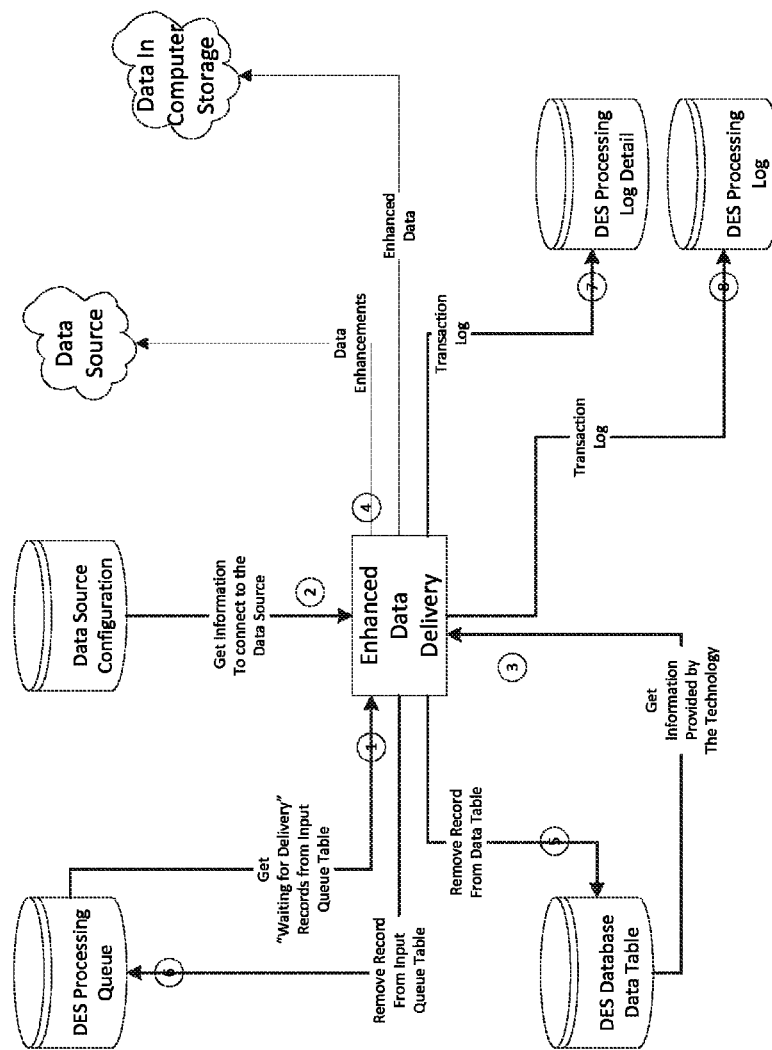
FIG. 11 presents an exemplary embodiment of the invention's component that is responsible to deliver the enhancements provided by each Technology to the Data Source or a predefined storage location for the data. In this example, the component shown in FIG. 11 presents a sample of the objects used by this component.

In some embodiments, the Enhanced Data Delivery Component's (6) function, among others, is to deliver the enhancements provided by each Technology to the data in the Data Source or deliver the enhanced data to a different predefined storage location. The Enhanced Data Delivery Component is controlled by a Component Manager & Load Balancer which manages the component and assigns the data it needs to process. The Component Manager & Load Balancer is designed to manage more than one Enhanced Data Delivery Component at a time. This architecture allows the Enhanced Data Delivery Component to scale in support of millions of data transactions that may need to be processed and by distributing the workload among multiple computers in different network locations, increase the performance of the overall process and reduce the time it takes to deliver the desired results. At the successful completion of this component's tasks the information for the next component in the system's workflow will be available in the system's database. The Enhanced Data Delivery Component embodiment shown in FIG. 11 presents an example of the objects used by this component and the order of the tasks this component executes.

All the components that make up the system are designed to deliver the specific functions they perform. Any computer programming language can be used to develop the systems' component. For performance and portability purposes the programming language C# (C sharp) may be used to develop an embodiment of any component. Components may also interact with existing industry standards such as XML (Extensible Markup Language), XSLT (Extensible Stylesheet Language Transformation), SQL language and its extensions is support of Relational Databases such as Microsoft SQL, FTP (File Transfer Protocol) and other standard communication protocols available in the market. In some additional embodiments of the system, components can be developed using browser based software development platforms with GUIs that interact with integrated development environments such as Microsoft Visual Studio and Eclipse.

Figure 12:
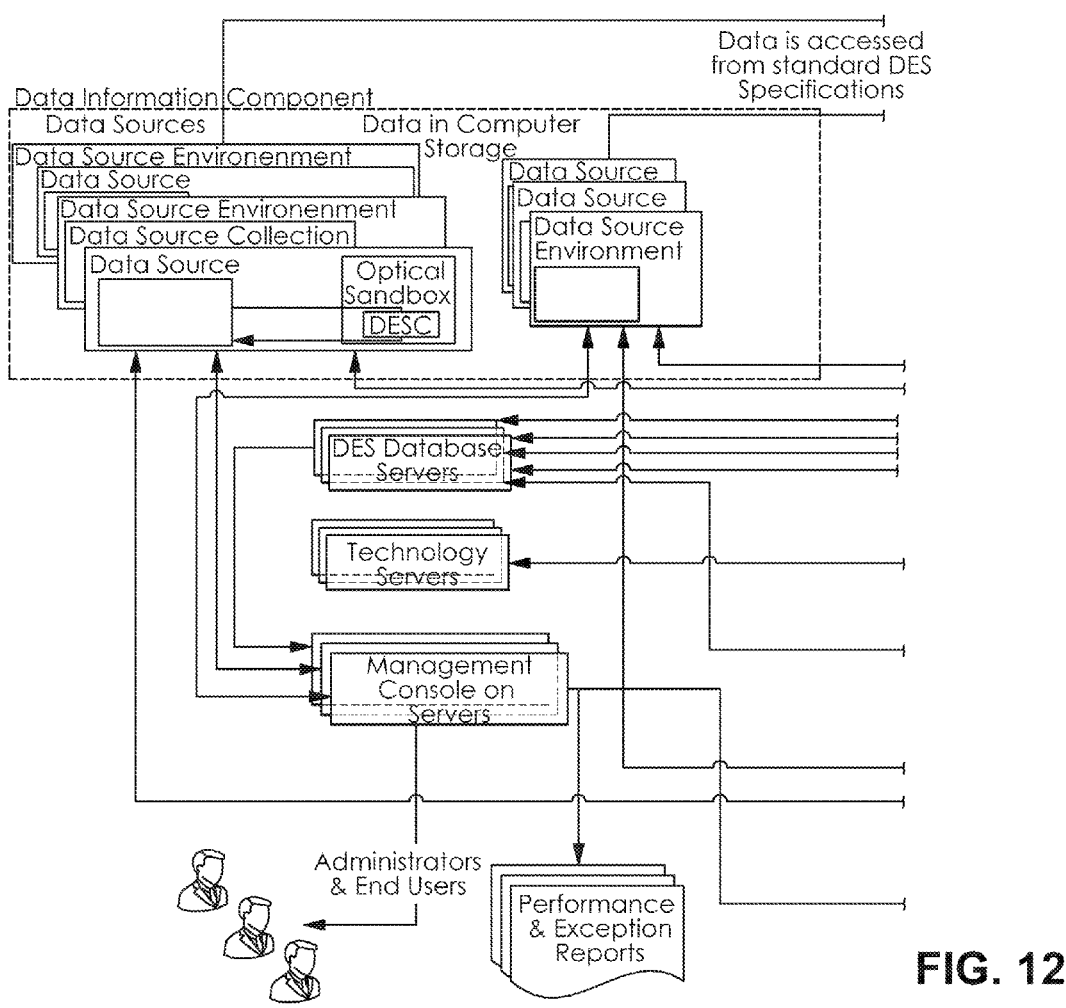
FIG. 12 illustrates an exemplary embodiment of the invention relating to the scalability and performance architecture methods and systems of the invention can be implemented. In this embodiment, the component shown in FIG. 12 presents a sample of how each component can be distributed and duplicated across multiple computers and across networks including the Internet.

To successfully enhance data, the computer implemented methods presented in FIG. 12 provide one example of how to accomplish the objectives of the system. The example in FIG. 12 present properly configured components with access to the system's database, a Data Enhancement Component working with each Technology and access to the data is available. In some embodiments, the system offers specific web services for external applications to communicate with it and all web services offered comply with industry standards. In some embodiments, the system has specific routines, written as a web service, to communicate with the Data Sources and Technologies. Additionally, in some embodiments, there is a specific XML specification design to ensure maximum flexibility to load data from any Data Source location and deliver it to the same Data Source location or any other Data Source location.

According to an embodiment of the present invention, data may be provided to the system, stored by the system and provided by the system to users of the system across local area networks (LANs) (e.g., office networks, home networks, wireless networks, near field communications) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment of the present invention a user may be able to compose data offline that will be consumed by the system when the user is later connected to a network.

According to an embodiment of the present invention, the system may be comprised of one or more application servers for electronically storing information used by the system. Applications in the server may retrieve and manipulate data in storage locations and exchange data through a WAN (e.g., the Internet). Applications in the server may also be used to manipulate data stored remotely and process and analyze data stored remotely across a WAN (e.g., the Internet).

According to an embodiment of the present invention, exchange of data through the WAN or other network may occur through one or more high speed connections. In some cases, high speed connections may be over-the-air (OTA), passed through networked systems, directly connected to one or more WANs or directed through one or more routers. Router(s) are completely optional and other embodiments in accordance with the present invention may or may not utilize one or more routers. One of ordinary skill in the art would appreciate that there are numerous ways server may connect to WAN for the exchange of data, and embodiments of the present invention are contemplated for use with any method for connecting to networks for the purpose of exchanging data. Further, while this application refers to high speed connections, embodiments of the present invention may be utilized with connections of any speed.

Components of the system may connect to a server via WAN or other network in numerous ways. For instance, a component may connect to the system i) through a computing device directly connected to the WAN ii) through a computing device connected to the WAN through a routing device, iii) through a computing device connected to a wireless access point or iv) through a computing device via a wireless connection (e.g., CDMA, GMS, 3G, 4G) to the WAN. One of ordinary skill in the art would appreciate that there are numerous ways that a component may connect to server via WAN or other network, and embodiments of the present invention are contemplated for use with any method for connecting to server via WAN or other network. Furthermore, server could be comprised of a personal computing device, such as a smartphone, acting as a host for other computing devices to connect to.

In a preferred embodiment of the present invention, the system is architected by separating the specific functions and tasks in the process into unique and self-supporting components. This architecture allows for scalability, reliability and load balancing of the work load to support a small volume of data to be processed or a very large volume of data reaching petabyte size and larger requirements with millions of transactions being processed daily. Additionally the architecture and design takes advantage of the hardware architecture for performance, so using a 32 bit, 64 bit or whatever the future technology will be only requires minor changes. The use of C# development language and open standards for communications and data transfers provides for system longevity.

The computer implemented methods for transaction processing and data processed of the system may be independent of the network location of the physical servers running the components of the system. This allows the system's computer implemented methods and components to be distributed across the world and duplicated in multiple servers while being connected via a network. This scalable architecture allows for maximum flexibility and use of equipment without dependencies between similar components of the system. Additionally there is no restriction to the number of Data Sources, storage locations or Technologies the system can simultaneously connect to. Once the data has been enhanced, the system copies the enhanced data to its Return Address.

In some embodiments, all configurations and controls are managed from a web based central management console. This console not only provides configuration and management functions but it also provides for, in printed an visual form, real time performance analysis as well as historical analysis at the transaction level.

To make this system you must first have a clear understanding of how Cloud Computing software applications and similar types of software applications work, specifically the reasons as to what the access restrictions they enforce are and why they exist. Having this understanding enables you to think how to create a solution that overcomes the restrictions.

Once the problem is identified, the next step is to create the conceptual design of the solution that addresses the problem. Without taking into consideration the specifics but at the same time understanding the problems, create a simple and logical design for further review. Once the conceptual design is final, it is broken down into its individual components for one Data Source. This will control the requirements and keep the design focused on its goal while keeping an architecture allowing for growth and expansion.

With the individual components identified, the component that works within the Data Source must then be tested in one sample implementation, this is to find out if this one critical component can be designed and implemented in a manner that works well with the Data Source.

Once the Data Source component is verified, details of the other components must be started by first establishing a standard data exchange architecture used by the components, then focusing on the design specifications for the functionality and then reviewing the same design specifications for performance improvements and scalability requirements. Numerous issues must be taken into account including but not limited to component independence, multiprocessing capability, I/O performance, memory requirements, capture of metrics and logging of these metrics, real-time performance reporting and overall ease of management of the system and its components.

Keeping in line with the requirements of scalability and large volume processing the next step is deciding on the programming language to be used and other standards that will balance the performance with existing standards. These decisions made, programming of the components start by breaking up the programming into the four main component categories: (1) Product Administration, (2) Data Source Components, (2) Internal data monitoring, accessing and preprocessing preparation, (3) Technology Integration and (4) Delivery of results.

In some embodiments, the computer implemented methods and components of the system are designed to run independently from each other but at the same time each uses the results of the previous component in the workflow to perform its function. Although the design and architecture takes into consideration scalability and performance by being able to deploy each component into different computers and network locations, the complete system can also run in a single computer or the methods which define each component combined into one all-encompassing method for one component and still deliver enhanced data but without taking advantage of an architecture that delivers scalability and performance improvements.

To use the system one has to know what data is going to be processed and the Data Sources that contain the data. The volume of data is also important to understand, as well as the Data Sources so that proper planning can be taken into consideration for processing time vs. the hardware configurations needed to be put in place to achieve the performance desired.

Once the Data Sources are identified and the hardware architecture selected the components of the system and the Technologies are installed in their respective systems and in the data sources. Once the components are in place communications between each system and the data sources are verified. Using the system's administration interface and the other software administration interfaces the software environment is configured to the end user specifications.

Once the configuration settings for the system are verified and the environment is working as planned, the data is processed and the enhancements verified at the data's Return Address.

Exemplary Embodiment

An example of an embodiment of the invention is its integration with a Microsoft® SharePoint® instance (e.g., SharePoint® 2007, SharePoint® 2010, SharePoint® 2013). Specifically, the Microsoft SharePoint instance that runs in Microsoft's Cloud, also known as "Office 365", has the restriction that any 3rd party software product that is installed in it must run in the "sandbox". The sandbox restricts the 3rd party software application from accessing certain functionalities and data structures in SharePoint. These restrictions prevent the 3rd party software application to access SharePoint's Term Store, the Object Model, the network and even the file system. These restrictions will not allow the 3rd party software application to work and therefore it can't be used.

The system's Data Information Collector Component successfully works in the sandbox of the Office 365 SharePoint instance. By using the basic "Event Receiver" functionality of SharePoint, this component will gather the data's information needed by the system's other components and stores it in a hidden list within SharePoint. The Data Information Collector Component of the system will retrieve the information from the hidden list and store it in the system's database for the remaining methods of the system to start. In the final step of the system's methods, the SharePoint update functionalities required by the component of that last step (the Enhanced Data Delivery Component) are not restricted by SharePoint's sandbox. This allows the enhancements to be stored with the data inside SharePoint in Office 365 and the process to complete successfully.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the system as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

According to an embodiment of the present invention, a data store may be comprised of one or more of a database, file storage system, relational data storage system or any other data system or structure configured to store data. In one embodiment of the present invention, the data store may be a relational database, working in conjunction with a relational database management system (RDBMS) for receiving, processing and storing data. In an embodiment using a RDBMS, the data store may comprise one or more databases for storing information related to the processing of moving information and estimate information as well one or more databases configured for storage and retrieval of moving information and estimate information. In another embodiment, the data store may be an unstructured data store (e.g., file store).

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A computer implemented system for simultaneously augmenting data in one or more data sources by using enhancements generated by different technologies, the system comprising:
   a component manager module, comprising computer-executable code stored in non-volatile memory,
   and a processor,
   wherein said component manager module and said processor are operably connected and configured to:
   receive notification that a first set of data is incompatible with a first application;
   intergrate a data information component with one or more data sources that contains said first set of data;
   receive, at said data information component, a first data source configuration from said one or more data sources;
   initiate a workflow initialization, wherein a data information collector component is instructed to retrieve said first data source configuration from said data information component, wherein said data information collector component updates a system database with a first information record associated with said first data set which contains said first data source configuration, wherein the system flags said first information record for processing;
   initiate a data download, wherein said first information record is processed and sent to a data access component, wherein said data access component retrieves said first data source configuration from said first information record, communicates with said one or more data sources and copies to the system database said first data set from said one or more data sources and wherein the system updates said first information record to indicate that said first data set is ready for preparation;
   initiate data preparation, wherein a data preparation component processes said first information record, wherein said data preparation component retrieves from the system database a first application configuration associated with said first application, wherein said data preparation component processes said first data set according to said first application configuration and generates a first prepared data set which meets requirements for use of said first application; wherein the system stores said first prepared data set in the system database and updates said first information record to indicate that said first prepared data set is ready to be enhanced;
   initiate a data enhancement, wherein said first prepared data set is sent to a data enhancement component associated with said first application and said data enhancement component interacts with said first application by providing said first prepared data set, wherein said first application modifies said first prepared data set and generates a first enhanced data set, wherein the system stores said first enhanced data set updates said first information record to indicate that said first enhanced data set is ready to be delivered; and
   initiate a data delivery, wherein said first information record is sent to an enhanced data delivery component, wherein said enhanced data delivery component retrieves said first data source configuration and copies said first enhanced data set to said one or more data sources, and wherein said first information record is updated to indicate that processing is complete.

2. The system of claim 1, wherein data source is a file repository.

3. The system of claim 1, wherein the data source utilizes unstructured data.

4. The system of claim 1, wherein the data source utilizes structured data.

5. The system of claim 4, wherein the structured data is in a relational format.

6. A method for simultaneously augmenting data in one or more data sources by using enhancements generated by different technologies, the method comprising:
   receiving at a data information component, a first data source configuration from said one more data sources;
   initiating a workflow initialization, wherein a data information collector component is instructed to retrieve said first data source configuration from said data information component wherein said data information collator component updates a system database with a first information record associated with said first data set which contains said first data source configuration, wherein the system flags said first information record for processing;
   initiating a data download, wherein said first information record is processed and sent to a data access component, wherein said data access component retrieves said first data source configuration from said first information record, communicates with said one or more data sources and copies to the system database said first data set from said one or more data sources and wherein the system updates said first information record to indicate that said first data set is ready for preparation;
   initiating data preparation, wherein a data preparation component processes said first information record, wherein said data preparation component retrieves from the system database a first application configuration associated with said first application, wherein said data preparation component processes said first data set according to said first application configuration and generates a first prepared data set which meets requirements for use of said first application; wherein the system stores said first prepared data set in the system database and updates said first information record to indicate that said first prepared data set is ready to be enhanced;
   initiating a data enhancement, wherein said first prepared data set is sent to a data enhancement component associated with said first application and said data enhancement component interacts with said first application by providing said first prepared data set, wherein said first application modifies said first prepared data set and generates a first enhanced data set, wherein the system stores said first enhanced data set and updates said first information record to indicate that said first enhanced data set is ready to be delivered; and initiating a data delivery, wherein said first information record is sent to an enhanced data delivery component, wherein said enhanced data delivery component retrieves said first data source configuration and copies said first enhanced data set to said one or more data sources, and wherein said first information record is updated to indicate that processing is complete.

7. The method of claim 6, wherein data source is a file repository.

8. The method of claim 6, wherein the data source utilizes unstructured data.

9. The method of claim 6, wherein the data source utilizes structured data.

10. The method of claim 6, wherein the structured data is in a relational format.

11. A distributed computer implemented system for simultaneously augmenting data in one or more data sources by using enhancements generated by different technologies, the system comprising:
one or more component manager modules, comprising computer-executable code stored in non-volatile memory on one or more computing devices,
and one or more processors on said one or more computing devices,
wherein said one or more component manager modules and said one or more processors are operably connected and configured to:
receive a first set of data that is incompatible with a first application;
integrate a data information component with one or more data sources that contains said first set of data;
receive, at said data information component, a first data source configuration from said one or more data sources;
initiate a workflow initialization, wherein a data information collector component is instructed to retrieve said first data source configuration from said data information component, wherein said data information collector component updates a system database with a first information record associated with said first data set which contains said first data source configuration, wherein the system flags said first information record for processing;
initiate a data download, wherein said first information record is processed and sent to a data access component, wherein said data access component retrieves said first data source configuration from said first information record, communicates with said one or more data sources and copies to the system database said first data set from said one or more data sources and wherein the system updates said first information record to indicate that said first data set is ready for preparation;
initiate data preparation, wherein a data preparation component processes said first information record, wherein said data preparation component retrieves from the system database a first application configuration associated with said first application, wherein said data preparation component processes said first data set according to said first application configuration and generates a first prepared data set which meets requirements for use of said first application, wherein the system stores said first prepared data set in the system database and updates said first information record to indicate that said first prepared data set is ready to be enhanced;
initiate a data enhancement, wherein said first prepared data set is sent to a data enhancement component associated with said first application and said data enhancement component interacts with said first application by providing said first prepared data set, wherein said first application modifies said first prepared data set and generates a first enhanced data set, wherein the system stores said first enhanced data set and updates said first information record to indicate that said first enhanced data set is ready to be delivered; and
initiate a data delivery, wherein said first information record is sent to an enhanced data delivery component, wherein said enhanced data delivery component retrieves said first data source configuration and copies said first enhanced data set to said one or more data sources, and wherein said first information record is updates to indicate that processing is complete.

12. The system of claim 11, wherein data source is a file repository.

13. The system of claim 11, wherein the data source utilizes unstructured data.

14. The system of claim 11, wherein the data source utilizes structured data.

15. The system of claim 11, wherein the structured data is in a relational format.

* * * * *